United States Patent

[11] 3,604,455

| [72] | Inventor | David H. Therneau<br>Sulphur Spring, Tex. |
|---|---|---|
| [21] | Appl. No. | 795,159 |
| [22] | Filed | Jan. 30, 1969 |
| [45] | Patented | Sept. 14, 1971 |
| [73] | Assignee | Rockwell Manufacturing Company<br>Pittsburgh, Pa. |

[54] PLUG VALVE ASSEMBLY
7 Claims, 4 Drawing Figs.

| [52] | U.S. Cl. | 137/583 |
|---|---|---|
| [51] | Int. Cl. | F16k 45/00 |
| [50] | Field of Search | 137/625.24, 625.22, 583; 251/310, 175, 309 |

[56] References Cited
UNITED STATES PATENTS

| 2,497,448 | 2/1950 | Grosboll | 251/309 X |
|---|---|---|---|
| 340,630 | 4/1886 | Simms | 137/625.22 |
| 1,245,988 | 11/1917 | Seidel | 137/625.24 |
| 3,464,449 | 9/1969 | Morton | 137/625.24 |

FOREIGN PATENTS

| 55,651 | 3/1891 | Germany | 137/625.24 |
|---|---|---|---|

*Primary Examiner*—M. Cary Nelson
*Assistant Examiner*—R. B. Rothman
*Attorney*—Strauch, Nolan, Neale, Nies & Kurz ABSTRACT: A plug valve assembly wherein the chamber enclosing the rotatable plug is automatically vented to atmosphere when the valve is closed by a vent valve arrangement connecting the plug port to a passage terminating outside the body when the valve is closed.

INVENTOR
DAVID H. THERNEAU

BY Strauch, Nolan, Neale,
Nies & Kurz
ATTORNEYS

PLUG VALVE ASSEMBLY

BACKGROUND AND SUMMARY OF INVENTION

This invention relates to plug valves wherein a rotary plug is turned between limit positions to open or close fluid passage through a valve body.

U.S. Pat. No. 2,970,805 issued Feb. 7, 1961 to Pool discloses a plug valve wherein resilient annular seals engage the body around the openings wherein the valve body passages intersect the chamber wherein a ported plug rotates, both upstream and downstream of the plug when the valve is in closed condition.

This provides upstream and downstream seals at opposite sides of the plug. This type of valve may be used in conduits supplying gas to gas burners in boilers or the like, and safety regulations require in addition that in addition to blocking line pressure the valve must be capable of automatically venting gas from the plug chamber when the valve is in closed condition. The purpose of this regulation is to provide that any gas leakage past the upstream seal will vent to atmosphere or a suitable safety environment and there will be no undesirable buildup of gas pressure within the valve chamber behind the downstream seal when the valve is in closed position.

An example of the service wherein the valve of the invention may be used contemplates a gas line wherein the normal pressure, which would be the upstream pressure, is about 25 pounds per square inch and the upstream seal is intended to withstand that pressure. The downstream seal, due to the effect of the gas pressure acting on the plug, may withstand about 40 pounds per square inch. By automatically venting the plug chamber when the valve is closed provision is made for insuring against gas leakage through the valve to the boiler even though the gas should leak past the upstream seal.

Prior to the invention no satisfactory single valve arrangements were known which would satisfy the safety requirements and provide practical protection at a reasonable cost. In practice it was customary to use two lubricated valves in tandem in gas lines of this type, with the valve nearest the boiler provided with a vented plug chamber. The present invention permits the use of a single nonlubricated valve with at least equal safety in operation.

It is therefore the major object of this invention to provide a novel plug valve wherein gas pressure within the valve body upstream of the downstream seal therein is automatically vented, as to atmosphere, when the valve is closed.

A further object of the invention is to provide a novel plug valve assembly wherein a vent valve in a plug valve chamber is automatically connected to discharge internal gas pressure when the valve plug is turned to closed position.

Another object of the invention is to provide a novel plug valve structure wherein the through port of the rotatable plug has an opening automatically connected to atmosphere only when the plug is in valve closed position. Other and more detailed objects of the invention include vent valve details and arrangement which will become apparent as the description of the preferred embodiment proceeds.

Figure 1:
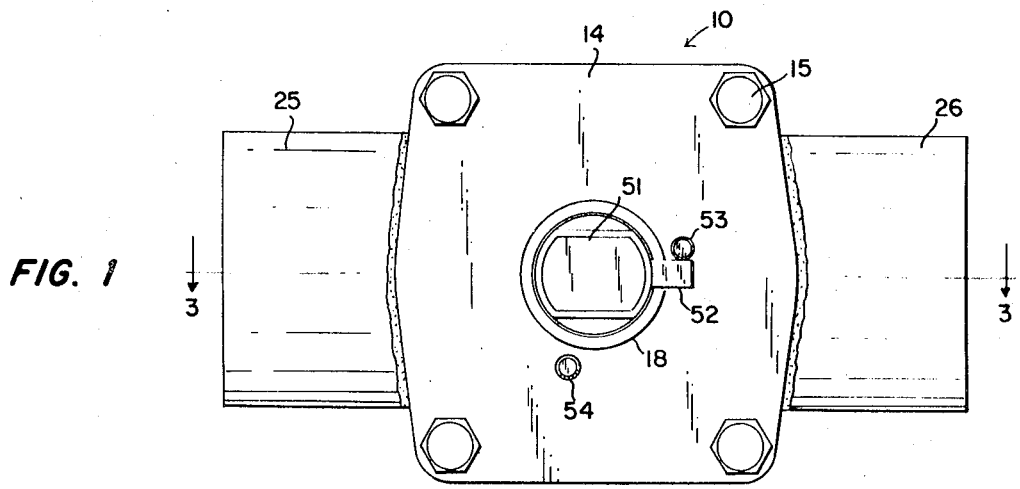
FIG. 1 is a top plan view showing a plug valve assembly incorporating a preferred embodiment of the invention, with the plug in the open position.

The invention for its preferred embodiment is disclosed as incorporated in a plug valve assembly 10 wherein a plug 11 is rotatably mounted within a chamber defined by bore 12 in a body 13. The upper open end of bore 12 is closed by a cover 14 secured to the body as by capscrews 15.

Figure 2:
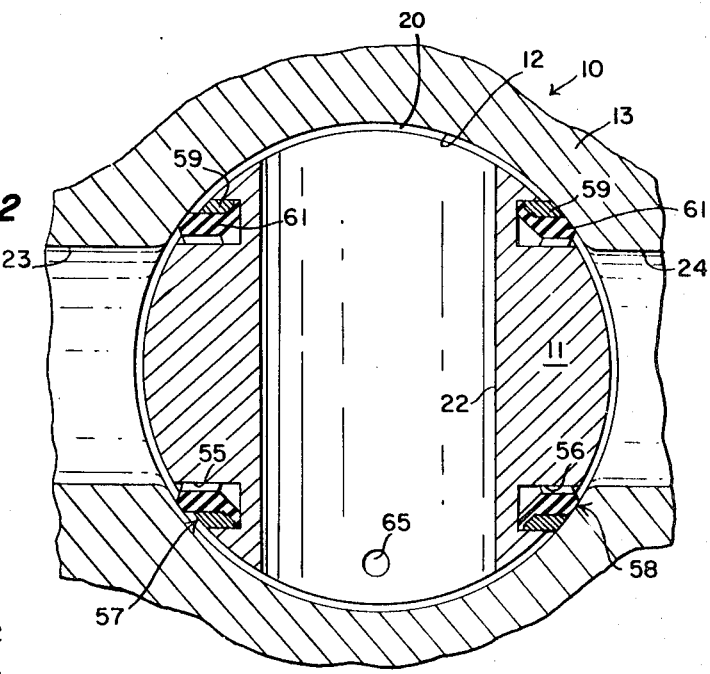
FIG. 2 is a section substantially on line 2—2 of FIG. 3 but rotated 90° about the vertical axis, showing the location of the plug vent port, and showing the valve in the closed position.
Figure 3:
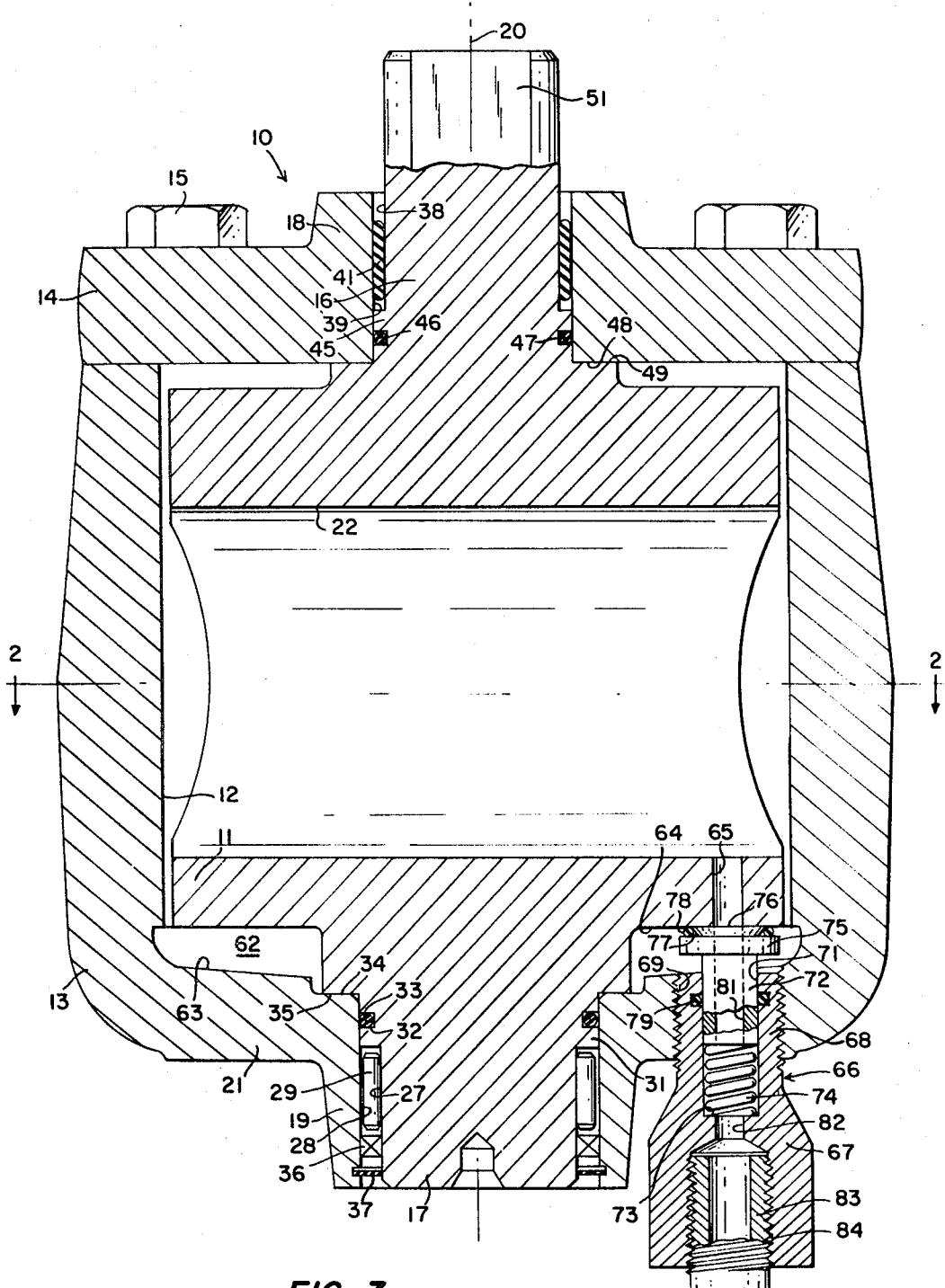
FIG. 3 is a section on line 3—3 of FIG. 1 and showing the main valve in the closed position, while the vent valve of this invention is shown in detail and in the open position to automatically vent the cavity.

As shown in FIG. 3, plug 11 has upper and lower trunnions 16 and 17 respectively rotatably mounted in aligned hollow bosses 18 and 19 in the cover 14 and bottom wall 21 of the body. As shown in FIG. 2 the surrounding chambers defining wall of bore 12 is spaced from plug 11 with a definite annular clearance 20. Plug 11 is thus rotatable about the axis 20 indicated in FIG. 3.

Plug 11 is formed with through port 22 that extends at right angles to axis 20. In the valve closed position of FIGS. 2 and 3, port 22 is disposed with its axis at right angles to the body passage provided by passages 23 and 24 that intersect bore 12 and are provided in opposite body projections 25 and 26 suitably formed for attachment to fluid conduits. When plug 11 is turned 90° to align port 22 with passages 23 and 24, the valve assembly is in open position.

As shown in FIG. 3 the lower plug trunnion has a cylindrical surface 27 concentric with surrounding cylindrical boss surface 28 to define a space for an annular row of bearing rollers 29. Inwardly of the bearing space the trunnion has a larger diameter cylindrical portion 31 rotatable within surface 28 and formed with an annular groove 32 mounting a radially compressed resilient seal ring 33. Inwardly of the seal, body 13 is formed with a flat annular thrust surface 34 surrounding the boss opening in a plane at right angles to axis 20 for seating the corresponding flat annular surface 35 on plug 11. Plug 11 rotates between open and closed positions with thrust surfaces 34 and 35 in sliding contact.

The outer end of the bearing space around the lower trunnion is closed by a seal ring 36 and an annular retainer disc 37, both preferably mounted on surface 28.

Upper trunnion 16 similarly has cylindrical surface 38 surrounded by cylindrical boss surface 39 to define a space for the row of bearing rollers 41. Inwardly of the bearing space trunnion 16 has an enlarged cylindrical portion 45 rotatable within surface 39 and formed with an annular groove 46 mounting a radially compressed resilient seal ring 47.

Plug 11 and the inner surface of cover 14 are formed with opposed flat annular thrust surfaces 48 and 49 that extend in planes perpendicular to axis 20. In the assembly, preferably surfaces 48 and 49 are in free sliding engagement for permitting rotation of plug 11, but the tolerance at both sets of thrust surfaces 34, 35 and 48, 49 are quite small, so that during operation plug 11 is effectively maintained against displacement along its axis 20.

The upper end of trunnion 16 terminates in a stem 51 formed to fit with a tool such as a wrench, for turning, and the stem carries a projection 52 for cooperation with cover stops 53 and 54 to define the 90° limit of turning of plug 11.

The foregoing valve structure is set forth mainly by way of explanation of the invention, and it may for example be that disclosed in U.S. Pat. No. 2,970,805 issued to E. B. Pool, to which reference is made for any further detail. As in said Pool patent, plug 11 in the invention is preferably formed at opposite sides of the port 22 with annular surface recesses 55 and 56 mounting identical composite seat ring assemblies 57 and 58 each consisting of a metal backup ring 59 bonded to a synthetic rubber or like resilient ring 61 extending into compressive sealing engagement with bore 12 and adapted to surround the intersections between bore 12 and body passages 23 and 24 when the valve assembly is in closed position.

As described in said patent, each resilient ring 61 is resiliently compressed between the bottom of its recess on the plug and the surface of bore 12. In this fashion these seat rings provide both upstream and downstream seals between the body passages 23 and 24 and the plug chamber in bore 12, regardless of the direction of flow it being noted that this valve is bidirectional.

It will be noted in FIG. 3 that an annular chamber space 62 is provided within he body at the junction of the lower trunnion and the plug between the inner surface 63 of the body and an annular flat surface 64 that extends around the plug lower portion and in a plane perpendicular to axis 20 and outwardly of the trunnion 17.

A vent opening 65 is formed in the plug connecting port 22 with space 62. In one position of rotation of plug 11, the fully closed position of FIG. 3, opening 65 is closed by a valve 66.

Valve unit 66 comprises a hollow tubular member 67 having a threaded end 68 by which it is mounted in a threaded opening 69 in body wall 21. Internally member 67 is formed with a cylindrical bore 71 for slidably mounting a hollow plunger and valve seat element 72. A shoulder 73 at the bottom of bore 71 provides an anchor for one end of a compression coil spring 74 that biases element 72 toward plug surface 64.

Within space 62, element 72 is formed with an enlarged flange 75 and terminates just beyond flange 75 in a flat smooth end face 76 adapted to seat flush on plug surface 64. An annular recess 77 is undercut on element 72 adjacent face 75, and a sealing annulus 78 in the form of a resilient O-ring of rubber or the like is mounted in the recess. Seal ring 78 is of such diameter when face 76 seats on plug surface 64, the seal ring forms a resilient fluidtight compression seal all around the periphery of face 76.

The periphery of bore 71 is grooved to mount a rubber seal ring 79 in sliding association with plunger 72.

When the parts are in the FIG. 3 closed valve position, wherein the plug 11 closes fluid passage through the valve assembly, it will be seen that passage 81 through plunger 72 is automatically aligned with vent opening 65. Chamber 20, in the valve closed condition, is sealed at the trunnion ends by seals 33 and 47, and adjacent body passages 23 and 24 by the seal rings 57 and 58 respectively. Thus in the valve closed position chamber 20 is vented through port 22, opening 65 and passage 81 with face 76 and ring 78 sealing against escape of fluid or pressure into space 62.

At the bottom of bore 71 is an outlet port 82 which connects to a fluid passage in a coupling 83 threaded into the member 67 at 84 and adapted to discharge into atmosphere or be connected to a suitable receiver (not shown). Should gas pressure leak past the upstream seal ring, for example ring 57, the pressure will occupy the chamber 20 and port 22, escaping from port 22 through the vent valve 66. Thus, any leakage past the upstream seal assembly 57 (or 58) into the body when the valve assembly is closed will be automatically vented outside the valve body.

Figure 4:
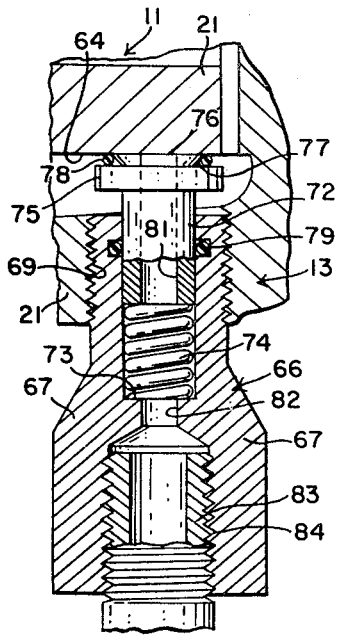
FIG. 4 is a fragmentary view in section showing the plug in the open position, as in FIG. 1, and the vent valve in the closed position.

When plug 11 is in any other position of rotation, as when it is in partially or fully open positions; face 76 will be urged into sealing engagement with plug surface 64 as shown in FIG. 4 thereby closing passage 81 with respect to body space 62 and the interior of the valve assembly. Thus the vent through valve unit 66 is sealed off in all except the fully closed position of valve plug 11. While opening 65 will be uncovered at surface 64 in valve open positions whereby fluid from port 22 may enter space 62, valve unit 66 is at the time sealed with respect to space 62 and flow through the vent system is possible only when the valve plug 11 is in closed position.

The valve face 76 and surface 64 on the plug are preferably ground smooth and plated with corrosion-resistant coating. This provides smooth engagement for both sealing and relative sliding, and the plating inhibits corrosion.

The invention therefore provides a mechanically simple safe, inexpensive and reliable valve assembly which provides for gas pressure venting between upstream and downstream seals. Operating the invention is simple and does not rely on pressure differentials, so that absolute reliability is insured.

The embodiments of the invention in which an exclusive property or privilege is claimed are defined as follows:

1. A plug valve assembly of the type wherein a valve body has a bore defining an internal chamber and means for rotatably mounting a ported plug within said chamber, said chamber comprising a clearance space around the plug in communication with the plug port in all conditions of operation of the plug, a fluid passage intersecting said bore at opposed openings which align with the plug port in the open condition of the valve assembly and are closed by the plug in the closed condition of the valve assembly and cooperating means between the plug and bore for sealing said chamber from said passage in the valve closed condition, characterized by means for automatically venting said chamber to the exterior of said body only when the plug is turned to closed valve position.

2. A plug valve assembly of the type wherein a valve body has a bore defining an internal chamber and means for rotatably mounting a ported plug within said chamber, said chamber comprising a clearance space around the plug in communication with the plug port in all conditions of operation of the plug, a fluid passage intersecting said bore at opposed openings which align with the plug port in the open condition of valve assembly, and annular seal rings extend between the plug and bore in the fully closed condition of the valve assembly for sealing said chamber with respect to said fluid passage; characterized by means including an opening extending from the plug port through the plug for automatically venting said chamber to exterior of said valve assembly when the plug has been rotated to fully closed valve position.

3. The plug valve assembly defined in claim 2, wherein said vent opening extends through the plug to connect said port to said chamber, and vent valve means is mounted on said body extending into said chamber and providing a passage from said opening through said chamber and the body when said plug is in valve closed position.

4. A plug valve assembly of the type wherein a valve body has a chamber comprising a bore for rotatably mounting a ported plug and a fluid passage intersecting said bore at opposed openings which align with the plug port in the open condition of valve assembly, and annular seal rings extend between the plug and bore in the fully closed condition of the valve assembly for sealing said chamber with respect to said fluid passage; characterized by means for automatically venting said chamber to the exterior of said valve assembly when the plug has been rotated to fully closed valve position comprising means defining a vent opening extending from said port through the plug to terminate in a flat face on the plug and connect said port to said chamber, vent valve means mounted on said body extending into said chamber and providing a sealed passage from said opening through chamber and the body when said plug is in valve open position, said vent valve means comprising a hollow plunger having a flat face in sliding engagement with said flat plug face and means resiliently biasing said plunger toward said plug, said faces engaging in a plane normal to the axis of turning of said plug.

5. A plug valve assembly of the type wherein a providing having a through port is rotatably mounted in a bore in a body chamber intersected by a fluid passageway through the body and wherein said plug when rotated to a predetermined position in said bore blocks fluid flow in said passageway, characterized by means providing a flat face on said plug in a plane at right angles to the axis of rotation of the plug and disposed adjacent a body wall in the assembly, means providing a vent opening extending through the plug between said port and said face, means slidably mounting a hollow valve plunger in said body wall, said plunger having a flat end face adapted to slidably engage said plug face, spring means biasing said plunger toward said plug, and means providing a discharge passage from the plunger to the exterior of said body, said vent opening and said valve plunger being so located that the plunger is automatically aligned with said opening to connect said plug port with said discharge passage when the plug is turned to said passageway blocking position and the inner end of said plunger is closed by the plug face in other positions of rotation of said plug.

6. A plug valve assembly as defined in claim 5, wherein an annular resilient seal is provided around said vent opening at the junction of said plunger end face and said plug face when the plug has been turned to closed position.

7. A plug valve assembly as defined in claim 6, wherein said seal comprises a resilient ring on said plunger surrounding said end face and adapted to engage said plug face.

UNITED STATES PATENT OFFICE
CERTIFICATE OF CORRECTION

Patent No. 3,604,455              Dated September 14, 1971

Inventor(s)   David H. Therneau

It is certified that error appears in the above-identified patent and that said Letters Patent are hereby corrected as shown below:

```
Column 3, line 2, change "he" to --the--.
        , line 20, change "75" to --76--.
Column 4, line 20, after "to" insert --the--.
        , line 49, change "providing" to --plug--.
```

Signed and sealed this 28th day of March 1972.

(SEAL)
Attest:

EDWARD M. FLETCHER, JR.           ROBERT GOTTSCHALK
Attesting Officer                 Commissioner of Patents